United States Patent
Gamache et al.

(10) Patent No.: US 9,273,730 B2
(45) Date of Patent: Mar. 1, 2016

(54) NON-CONTACT SPLIT SEAL

(71) Applicants: Michael Gamache, Tolland, CT (US); Christopher SK Yi, Coventry, CT (US)

(72) Inventors: Michael Gamache, Tolland, CT (US); Christopher SK Yi, Coventry, CT (US)

(73) Assignee: The Carlyle Johnson Machine Company, Bolton, CT (US)

( * ) Notice: Subject to any disclaimer, the term of this patent is extended or adjusted under 35 U.S.C. 154(b) by 0 days.

(21) Appl. No.: 14/486,327

(22) Filed: Sep. 15, 2014

(65) Prior Publication Data

US 2015/0219221 A1 Aug. 6, 2015

Related U.S. Application Data

(60) Provisional application No. 61/935,026, filed on Feb. 3, 2014.

(51) Int. Cl.

| F16J 15/40 | (2006.01) |
|---|---|
| F16C 33/76 | (2006.01) |
| F16C 33/72 | (2006.01) |
| F16J 15/42 | (2006.01) |
| F16C 33/66 | (2006.01) |
| F16C 35/04 | (2006.01) |
| F16C 19/54 | (2006.01) |

(52) U.S. Cl.
CPC ........... F16C 33/766 (2013.01); F16C 33/6666 (2013.01); F16C 33/72 (2013.01); F16C 35/042 (2013.01); F16J 15/406 (2013.01); F16J 15/42 (2013.01); F16C 19/543 (2013.01); F16C 33/723 (2013.01)

(58) Field of Classification Search
CPC ..... F16J 15/42; F16C 41/008; F16C 2370/12; F16C 15/406; F16C 15/42; F16C 33/766; F16C 33/6681; F16C 33/72; F16C 33/6666; F16C 35/042; F16C 19/543; F16C 33/723
USPC .......................................................... 277/427
See application file for complete search history.

(56) References Cited

U.S. PATENT DOCUMENTS

| 2,779,640 | A | | 1/1957 | Jones, Jr. | |
|---|---|---|---|---|---|
| 3,124,502 | A | * | 3/1964 | RadKe | F16J 15/20 277/536 |
| 4,383,720 | A | | 5/1983 | Ernst | |
| 4,575,306 | A | * | 3/1986 | Monnot | F04D 29/126 277/380 |
| 5,571,268 | A | * | 11/1996 | Azibert | F16J 15/3488 277/370 |

(Continued)

FOREIGN PATENT DOCUMENTS

| DE | 102004053079 B3 | 8/2006 |
|---|---|---|
| FR | 2229885 A1 | 12/1974 |

OTHER PUBLICATIONS

Machine Translation of DE102004053079 Dated Aug. 3, 2006.

*Primary Examiner* — Kristina Fulton
*Assistant Examiner* — Nathan Cumar
(74) *Attorney, Agent, or Firm* — McCormick, Paulding & Huber LLP

(57) ABSTRACT

A non-contact seal for rotatable shafts includes a stator ring and a rotor ring with internal pumping discs. Each of the, the stator ring pumping discs, and the rotor ring is split diametrically into two halves for mounting on a rotatable shaft at an intermediate station without having access to the end of the shaft or without having to remove other components. Various sealing components are employed between the split rings to prevent fluids within the seal from leaking out.

22 Claims, 7 Drawing Sheets

(56) References Cited

U.S. PATENT DOCUMENTS 5,662,340 A * 9/1997 Bessette ............... F16J 15/3488
                                                          277/374

6,170,832 B1 * 1/2001 Ernst ...................... F16J 15/447
                                                          277/412
2002/0101038 A1 * 8/2002 Budrow ................ F04D 29/124
                                                          277/370

* cited by examiner

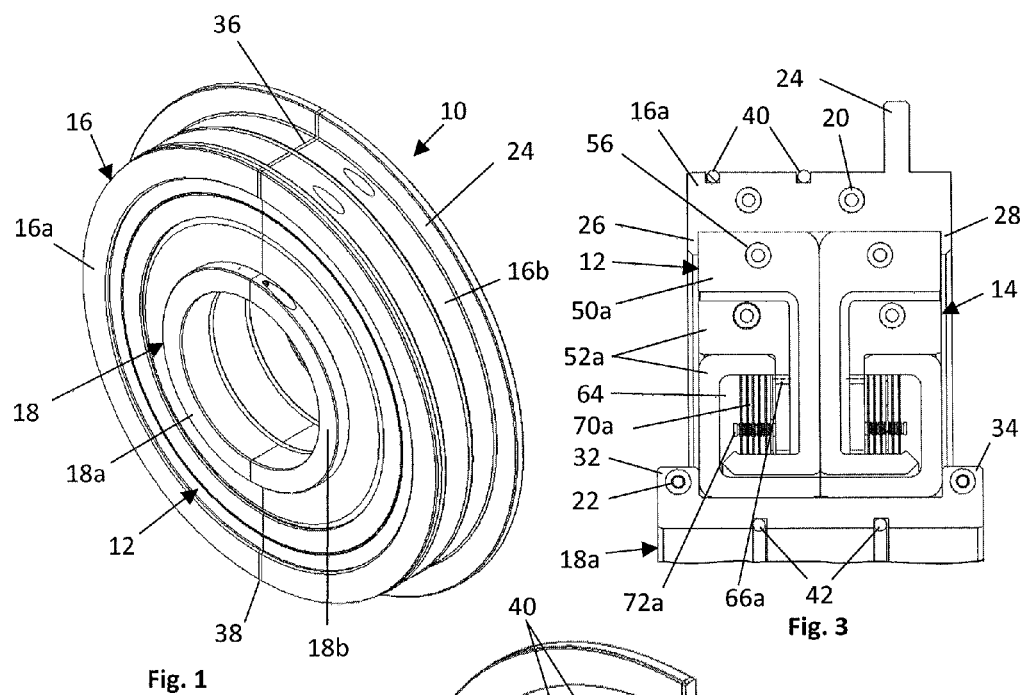
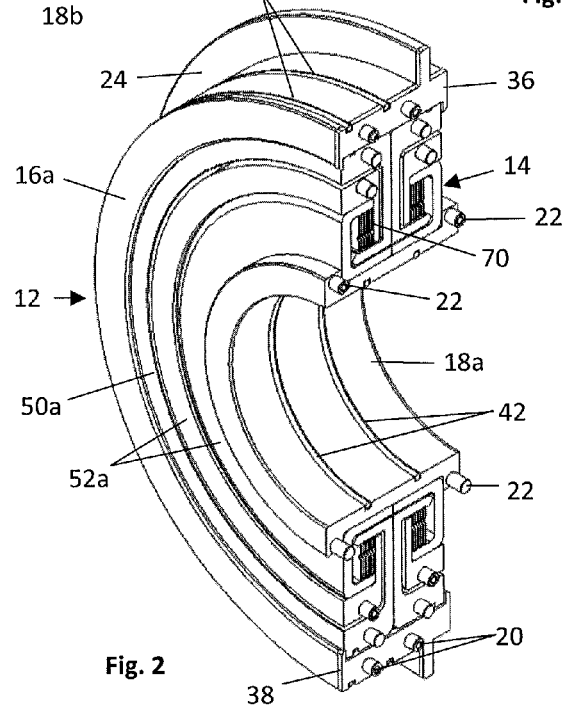
Fig. 1
Fig. 2
Fig. 3

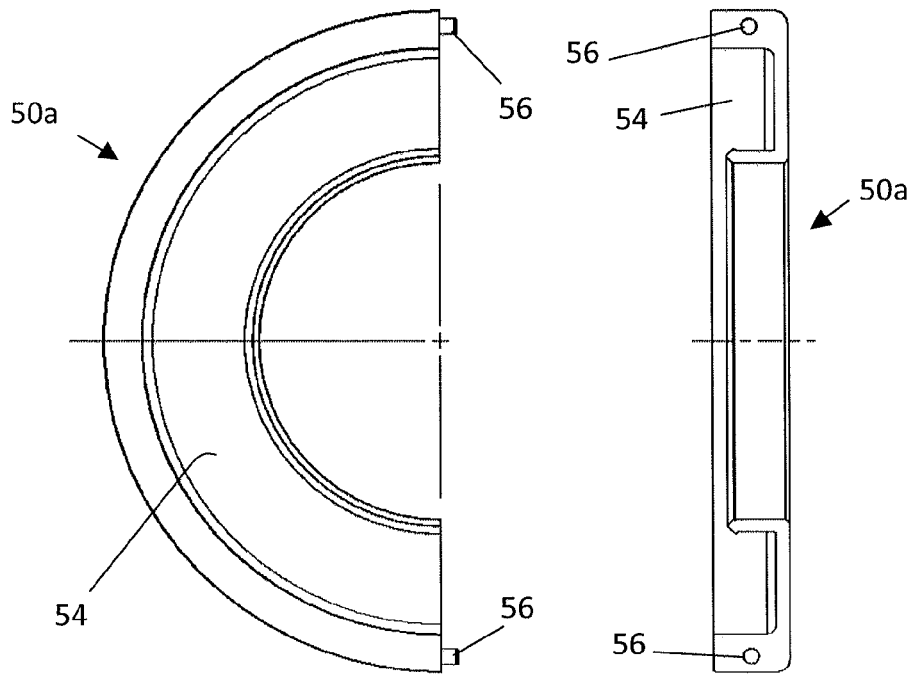
Fig. 4a
Fig. 4b
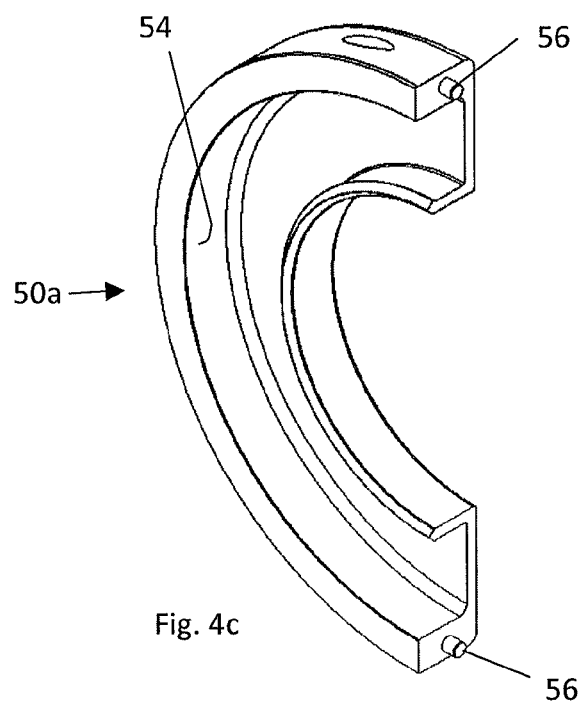
Fig. 4c

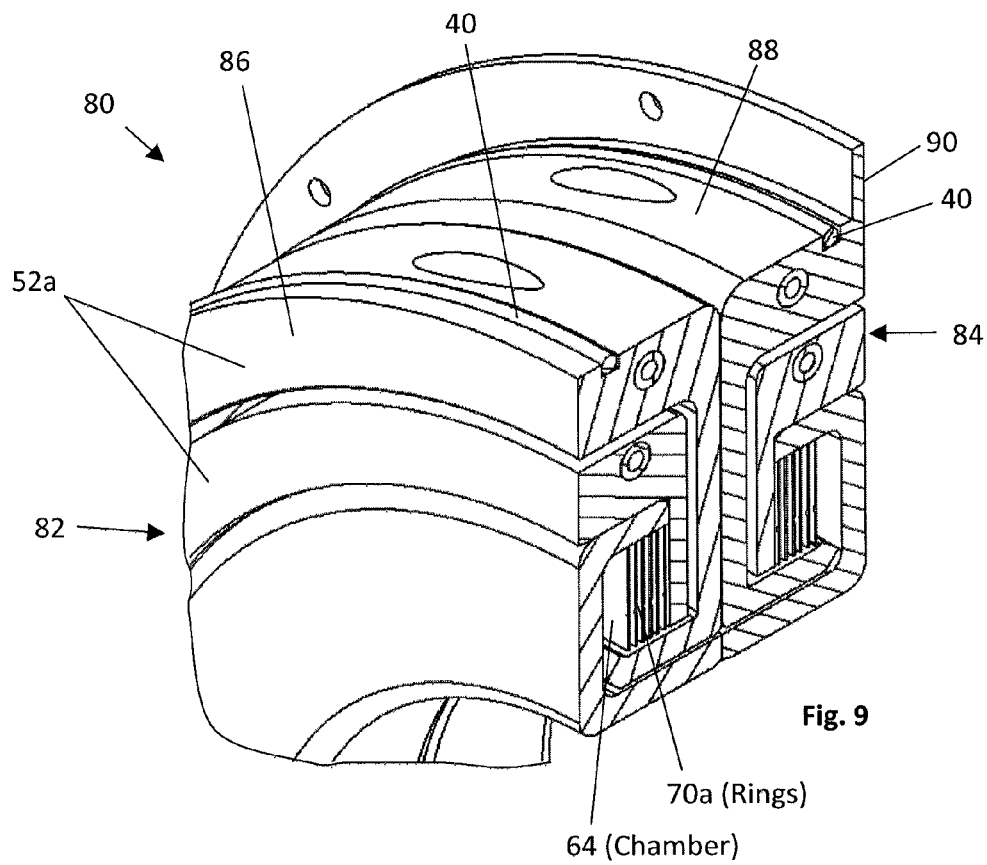
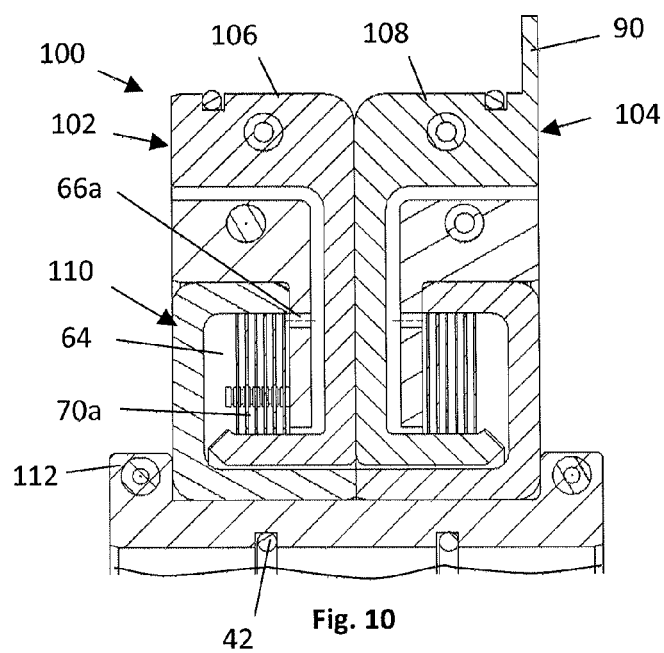

NON-CONTACT SPLIT SEAL

CROSS REFERENCE TO RELATED APPLICATIONS

The present application claims priority from Provisional Application 61/935,026 filed Feb. 3, 2014 and incorporates the disclosure of the provisional application herein by reference.

FIELD OF THE INVENTION

The present invention relates to non-contact seals for rotatable shafts which protect against the loss of lubricating fluid and prevent the admission of contamination. A non-contact seal has a low resistance to rotation because the sealing surfaces moveable rotationally relative to one another are not in frictional contact.

BACKGROUND OF THE INVENTION

Non-contact seals are known in the art and generally fall into categories of labyrinth, hybrid labyrinth, and centrifugal pressure seals. Such seals are used to keep lubricating fluids in a rotatable shaft bearing, and may also keep foreign contaminants out of the environment of a rotating shaft.

An example of a centrifugal pressure seal for roller or ball bearings having a lubricating fluid is found in U.S. Pat. No. 6,170,832 to Ernst. In such a seal a centrifugal pumping chamber pressurizes a portion of the lubricating fluid when the bearing is rotated, and feeds the pressurized lubricating fluid to the bearing to fill the bearing with lubricant or replenish lubricant that has been lost. The seal also is used to prevent contaminants from passing through the seal into the environment of the rotating shaft.

A number of environments that until now could use the advantages of a non-contact seal have not been able to take advantage of the centrifugal pressure seals for various reasons.

For example, the prior art seal in U.S. Pat. No. 6,170,832 is comprised of annular components that require access to the end of a shaft in order to mount or dismount the seal on the shaft. If a gear, sprocket, housing, or bracket is already in place on the shaft, or if other structure blocks the end of the shaft, the seal cannot be mounted on the shaft until the obstructing object is removed. Removal of the obstructing object can be costly and time consuming, or may not be possible at all without destroying other parts of a machine.

It is therefore an object of the present invention to provide a non-contact seal with low friction which can be mounted on a shaft without having access to the end of the shaft. Hence the seal can be mounted at positions intermediate the ends of the shaft.

SUMMARY OF THE INVENTION

The present invention relates to a non-contact seal that is formed by components that are split diametrically to allow mounting and removal at intermediate stations along a rotatable shaft without disturbing other objects, such as shaft bearings, gears, or sprockets mounted on the shaft between the seal and end of the shaft.

The non-contact seal for shaft bearings has an outer seal retention sleeve split diametrically in two halves with connecting elements enabling the joining of each half to the other to form a complete outer seal retention sleeve. The complete retention sleeve would circumscribe a seal axis or axis of the shaft serviced by the seal.

A stator ring in the seal is split diametrically in two halves, and has connecting elements for joining each half in mating relationship with the other to form a complete stator ring circumscribing the seal axis. The complete stator ring defines an annular channel circumscribing the stator ring and facing in the axial direction of the seal. The complete stator ring also fits within the outer seal retention sleeve with an interference fit.

A rotor ring in the seal is split diametrically in two halves, and has connecting elements for joining each half in mating relationship with the other to form a complete rotor ring of the non-contacting seal. The complete rotor ring defines an annular centrifugal pressurizing chamber circumscribing the rotor ring for pressurizing lubricating or other fluids in the chamber when the rotor ring is rotated about the axis of the seal or rotatable shaft. The annular centrifugal pressurizing chamber is positioned in the annular channel of the stator ring and has a discharge port at the outer periphery of the chamber for discharging pressurized fluid into the annular channel of the stator ring.

An inner seal retention sleeve is split diametrically in two halves, and has connecting elements enabling the joining of each half to the other to form a complete inner seal retention sleeve circumscribing the seal axis, or axis of the shaft serviced by the seal. The inner seal retention sleeve and the rotor ring have an interference fit.

In alternate embodiments of the seal the outer retention sleeve may form part of the housing supporting the shaft or its mounting features may be incorporated into the stator ring. Similarly, the mounting features of the inner retention sleeve may form part of the rotor ring or a sleeve on the shaft.

Consequently, the non-contact seal with diametrically split components can be mounted on a rotatable shaft at intermediate stations along the shaft by splitting the mating halves of each component, and placing each half on opposite sides of the shaft and then re-connecting the mating halves of each component. The seal would typically be assembled at an intermediate station along the shaft starting with the inner seal retention sleeve and working radially outward from the shaft with the mating components of the rotor ring, the stator ring, and lastly the outer seal retention sleeve. As a result the non-contact seal can be installed on a rotatable shaft without having access to the end of the shaft, or removing components already positioned on the shaft or closely adjacent the end of the shaft.

BRIEF DESCRIPTION OF THE DRAWINGS

FIG. 1 is a perspective view of the non-contact seal of the present invention in one embodiment.

FIG. 2 is a perspective view showing one half of the non-contact seal of FIG. 1 split at the parting planes of the multiple components of the seal.

FIG. 3 is a fragmentary frontal view of the non-contact seal split at the parting planes of the multiple components of the seal.

FIG. 4a is a side view showing one half of the stator ring of the non-contact seal split at the parting plane.

FIG. 4b is a frontal view showing the one half of the stator ring in FIG. 4a at the parting plane.

FIG. 4c is a perspective view of the one half of the stator ring in FIG. 4a.

FIG. 9 is a perspective view of another embodiment of the non-contact seal in which the features of the outer retention sleeve are incorporated in the stator ring.

FIG. 10 is a frontal view at the parting plane of another embodiment of the non-contact seal in which the mounting features of the inner retention sleeve are incorporated into the rotor ring.

FIG. 12 is an enlarged fragmentary perspective view of the stator ring half in FIG. 11 at the upper end.

DESCRIPTION OF THE PREFERRED EMBODIMENTS

Figure 5:
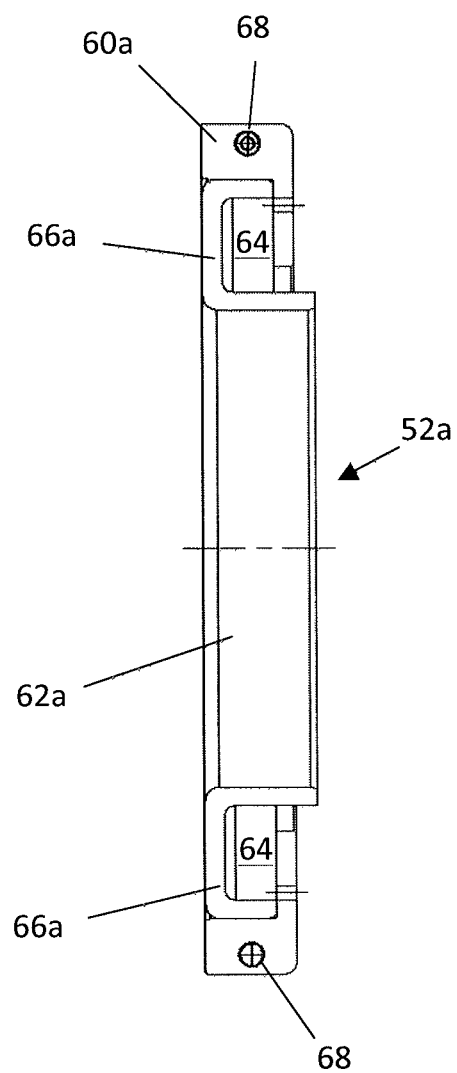
FIG. 5 is a frontal view showing one half of the rotor ring at the parting plane.

FIGS. 1-3 show the novel non-contact split seal 10 of the present invention for use with rotatable shafts in one embodiment. The seal has multiple purposes and can maintain fluid lubricants within a rotatable bearing as well as prevent contaminants from entering a bearing and the environment at either side of the bearing.

A principal feature of the seal 10 is its components are split diametrically to allow the seal to be installed on a shaft without having access to the end of the shaft in order to slide the seal onto the shaft. The seal therefore can be mounted and dismounted at intermediate stations along a shaft without removing bearings, sprockets, cranks, bracing, or other interfering objects elsewhere along the shaft between the end of the shaft and the station where the seal is desired.

The seal 10 illustrated is actually a double seal is comprised by a lubricant seal 12 and a contaminant seal 14 positioned coaxially between an outer seal retention sleeve 16 and an inner seal retention sleeve 18. The outer sleeve 16 is split diametrically at a parting plane into two halves 16a and 16b that are connected and clamped together by screws 20 extending perpendicular to the parting plane. The inner sleeve 18 is similarly split diametrically at a parting plane into two halves 18a and 18b that are connected and clamped together by screws 22 extending perpendicular to the parting plane.

As shown in FIG. 3, the outer retention sleeve 16 has an outer mounting flange 24 and inwardly projecting flanges 26 and 28. The inner retention sleeve 18 has outwardly projecting flanges 32 and 34 to capture the lubricant seal 12 and contaminant seal 14 securely within the sleeves.

If desired, gaskets 36, 38, or a paste-like gasket material, can be interposed between the confronting portions of two halves 16a, 16b of the outer seal as shown in FIG. 2 to provide a positive fluid seal between the two halves. The gaskets may also serve as spacers between the two halves to compensate for the material removed in manufacturing the two halves by sawing a ring-shaped sleeve into the two halves so that the two halves 16a, 16b form a geometrically accurate circle when clamped together. Similar gaskets or gasket material may be used between the two halves 18a, 18b of the inner retention sleeve 18 if desired.

To insure sealing in a bearing housing with which the seal 10 is employed, a set of resilient sealing rings 40 may be set in external grooves in the outer retention sleeve 16. Correspondingly to insure sealing with a shaft with which the seal 10 is employed, a set of resilient sealing rings 42 may be set in internal grooves in the inner retention seal 18.

As indicated above, the seal 10 is a double seal comprised of a lubricating seal 12 and a contaminant seal 14 mounted is axially adjacent relationship in the outer and inner retention sleeves 16 and 18. In the double seal arrangement the seal 12 performs the function of maintaining a lubricating fluid in a bearing supporting a rotatable shaft on which the seal is mounted, and the contamination seal 14 performs the function of excluding contaminants from passing through the seal 10. While both functions are desirable, nothing prevents the lubricating seal 12 and the contaminant seal 14 from being employed independently to perform their respective functions. For independent utilization of the seals 12 and 14, the axial length of the sleeves 16 and 18 would be reduced to accommodate the axial length of the respective seal. Moreover, the construction and operation of the seals 12 and 14 are similar as explained in greater detail in U.S. Pat. No. 6,170,832 to Ernst. Accordingly, the present invention is hereafter described in the context of an embodiment utilizing the single lubricating seal 12, with the understanding that the seal could alternatively be the contaminant seal 14, or both seals in combination, and the basic principles of construction and operation would be the same.

Figure 8:
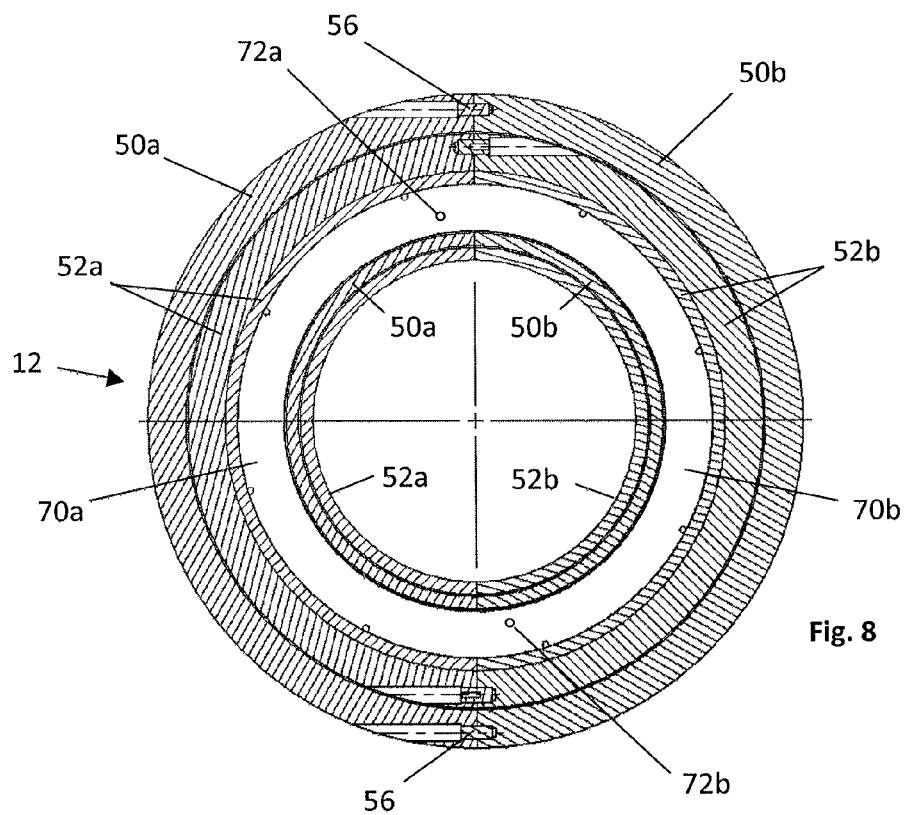
FIG. 8 is a cross-sectional view of the assembled rotor ring and stator ring in FIG. 7.
Figure 7:
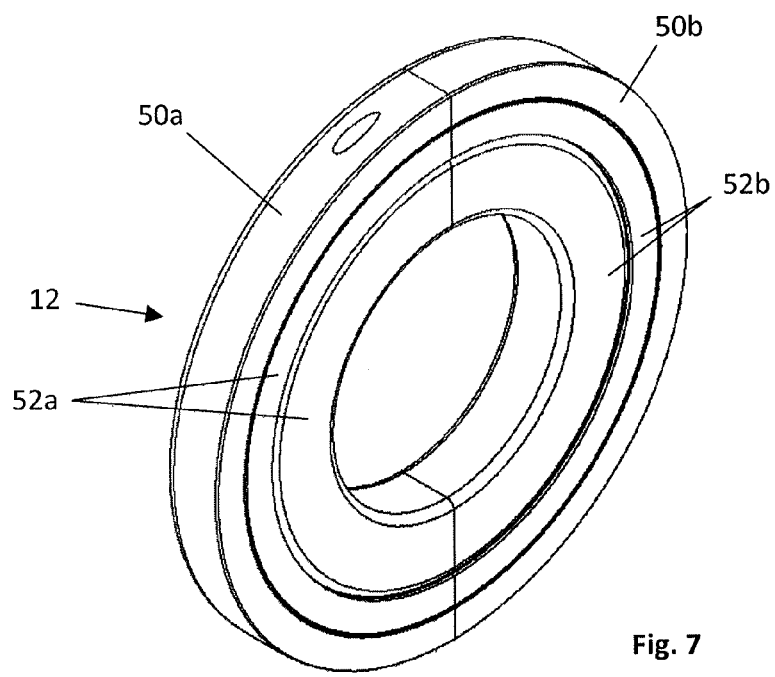
FIG. 7 is a perspective view of the assembled rotor ring and stator ring.

The non-contact sealing function is performed by a stator ring 50 and a rotor ring 52 shown in combination in FIGS. 3, 7, and 8. The stator ring 50 is split diametrically into two halves 50a and 50b, the half ring 50a being shown in more detail in FIGS. 4a-4c. The stator ring has an annular channel 54 that circumscribes the ring on one axially end face. When mounted next to a bearing, the annular channel faces the bearing in the axial direction to deliver lubricating fluid to the bearing.

Figure 6:
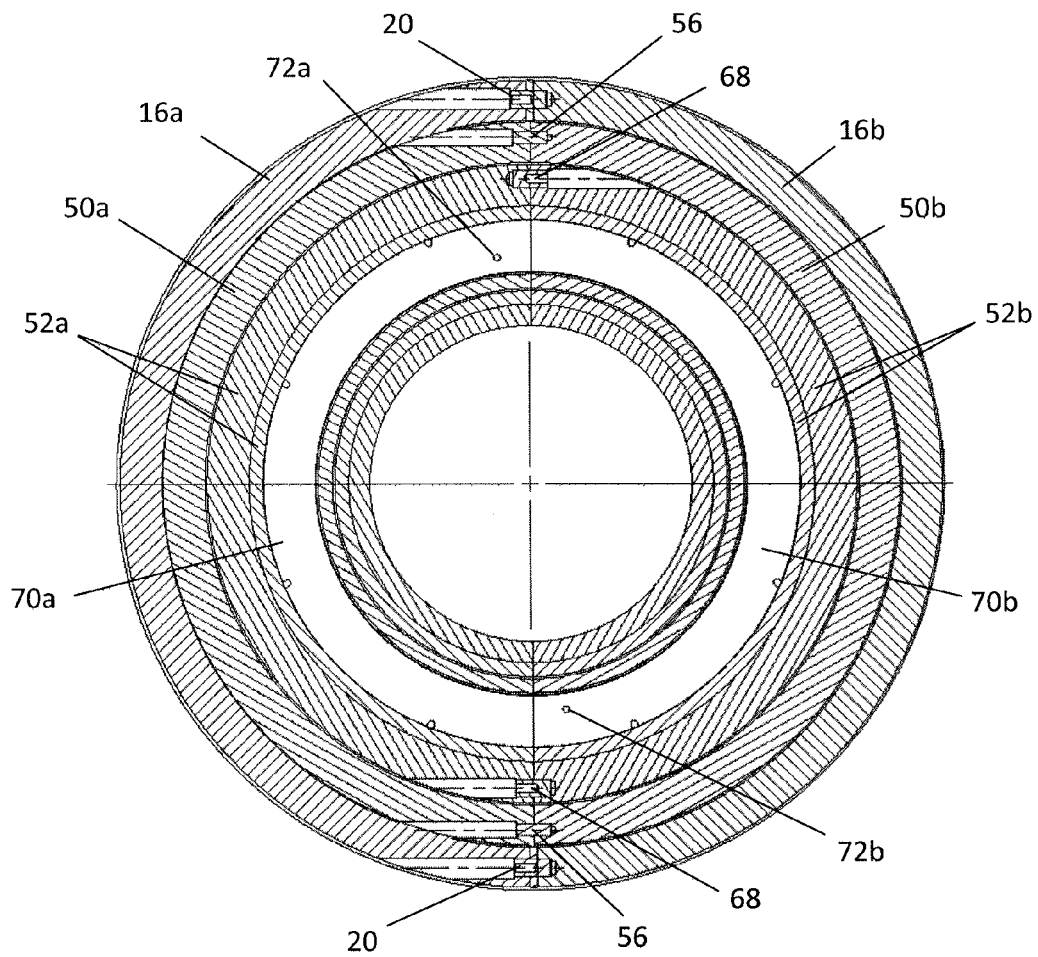
FIG. 6 is cross-sectional view of the assembled non-contact seal in FIG. 1

The stator ring halves 50a and 50b are held in an assembled state by means of screws 56 extending between the two halves perpendicular to the parting plane of the two halves as shown in FIGS. 6 and 8. Additionally, the stator halves are held in an assembled state by the two halves 16a, 16b of the outer retention sleeve 16 which are clamped against the two halves of the stator ring 50 by means of the screws 20. The two halves of the outer retention sleeve and the stator ring are dimensioned to have an interference fit the so that the halves 50a and 50b of the stator ring are pressed together in the assembled state to prevent leakage at the parting plane. A gasket or paste-like gasket material, similar to the gaskets 36 and 38 between the two halves of the retention ring, can also be interposed between the two stator halves 50a and 50b to prevent leakage of lubricating fluid from the stator ring at the parting plane.

The rotor ring 52 is split diametrically into two halves 52a and 52b as indicated in FIGS. 2, 3, 7,and 8. The half ring 52a is shown in more detail in FIG. 5, and is comprised by two semicircular parts 60a, 62a that are press-fit together to form half of annular centrifugal pressurizing chamber 64 circumscribing the axis of the rotor ring with discharge ports 66a at the outer periphery of the chamber in part 60a, similar ports being located in part 60b. The inner part 62a of the rotor ring may be made as a stamped sheet metal part. The other half 52b of the rotor ring is constructed in the same fashion as the half 52a, and is a mirror-image of the half 52a.

The two halves 52a, 52b of the rotor ring 52 are assembled and connected together to form the centrifugal pressurizing chambers 64 by means of screws 68 in the same manner as the two halves 50a, 50b of the stator ring 50. A gasket or paste-like gasket material, similar to the gaskets 36 and 38 between the two halves of the retention ring, can also be interposed between the two rotor halves 52a, 52b to prevent leakage of lubricating fluid from the rotor ring at the parting plane between the halves.

As shown in FIGS. 2, 3, 6, and 8 a plurality of pumping discs 70 split diametrically into two semicircular groups of discs 70a and 70b are positioned in the pressurizing chamber 64 of the rotor halves 52a, 52b respectively. The group of discs 70a are held by a locating pin 72a in the portion of the chamber 64 in the rotor half 52a, and the group of discs 70b are held by a locating pin 72b in the other portion of the chamber 64 in the rotor half 52b. The pins 72a, 72b are positioned 180° from each other near the opposite ends of the groups of pumping discs.

In assembling the seal 12 on a rotatable shaft, the two halves 18a, 18b of the inner seal retention sleeve 18 are positioned on the shaft first wherever desired and without regard to access to the end of the shaft or objects such as bearings or sprockets between the desired location and the end of the shaft. A gasket or gasket sealing material is placed between the mating surfaces at the parting plane of the two halves. The inner sleeve is secured in place with screws 22 shown in FIG. 2 in the flanges 32, 34 of the sleeve. Then the two halves 52a, 52b of the rotor ring 52 with the pumping discs 70a and 70b within are secured on the inner retention sleeve 18 between the flanges by means of the screws 68, preferably with an interference fit between the sleeve and the ring. A gasket or gasket sealing material is placed between the mating surfaces at the parting plane of the halves. After the rotor ring 52 is assembled, the two halves 50a, 50b of the stator ring 50 are assembled by screws 56 with the rotor ring 52. Again a gasket or gasket sealing material is applied between the mating surfaces. As shown in FIGS. 2, 3, and 7 the assembled rotor ring and stator ring are positioned in axially overlying relationship with the portion of the rotor ring defining the centrifugal pressure chamber 64 located within the annular groove 54 of the stator ring in non-contacting relationship.

In the final step in the assembly process, the outer seal retention sleeve 16 is mounted over the stator ring 50 with the ring captured between the flanges 26, 28. A gasket or gasket sealing material may be used between the mating surfaces at the parting plane of the sleeve. The mating circumferential surfaces of the outer retention sleeve 16 and the stator ring 50 preferably have an interference fit to securely hold the two halves of the stator ring together.

With the non-contact seal assembled on a rotatable shaft adjacent a bearing, and ready for use, the seal is filled to the appropriate level with a fluid lubricant through a fill port in the outer sleeve or through the bearing. In filling through the bearing, the fluid lubricant will reach the seal through the discharge ports 66a in the axial end face of the rotor.

In operation, the non-contact split seal operates in the same basic manner as a non-split seal. The rotor ring 52 and the pumping discs 70a and 70b within rotate with the shaft and cause the fluid lubricant to be thrown outwardly by centrifugal force and produce pressurized fluid at the outer periphery of the pressurizing chamber where the discharge ports 66a are located. The pressurized fluid is force out of the chamber into any voids in the adjacent bearing.

If the non-contact split seal is used as a barrier to prevent the passage of contaminants through the seal from on one axial side of the seal to the other, the operation is similar except that a different fluid is pumped in the pressurizing chamber depending on the environment. For example, if water attempts to penetrate the seal, the water reaching the pumping discs will be expelled by the centrifugal pressure in the pressurizing chamber of the rotor.

FIG. 9 illustrates another embodiment of the non-contact double seal 80 comprised of a lubricant seal 82 and a contaminant seal 84 in which the mounting and alignment features of a separate outer retention sleeve are incorporated in the stator rings 86 and 88. Hence, the seal can be mounted directly in a housing supporting the seal and a rotatable shaft, and a separate outer retention sleeve is not necessary. In particular, the stator ring 86 has an annular grove for a resilient sealing ring 40. The stator ring 88 has another annular grove for a resilient sealing ring 40 and a mounting flange 90. The other parts of the seal correspond to the parts of the seal 10 in FIGS. 1-8 bear the same reference numbers, and operate in the same fashion as previously described. Therefore, the purpose and function are not repeated here.

FIG. 10 illustrates another embodiment of the non-contact double seal 100 comprised of a lubricant seal 102 and a contaminant seal 104. The parts of the seals 102 and 104 are similar to the parts of the seals 10 and 80, and operate in the same manner to lubricate and prevent contamination. The seal 100 has a split stator rings and split rotor rings for mounting on a rotatable shaft as in the previous embodiments. However, the rotor rings incorporate the mounting features of the inner sleeve 18, and hence a separate inner retention sleeve is not necessary.

In particular, each half of the rotor ring 110 forming part of the seal 102 integrates the mounting features of the inner retention sleeve 18, namely the outwardly projecting flange 112 and the inwardly facing annular groove for a sealing ring 42. The other rotor ring in the seal 104 is similarly formed.

Figures 11, 13:
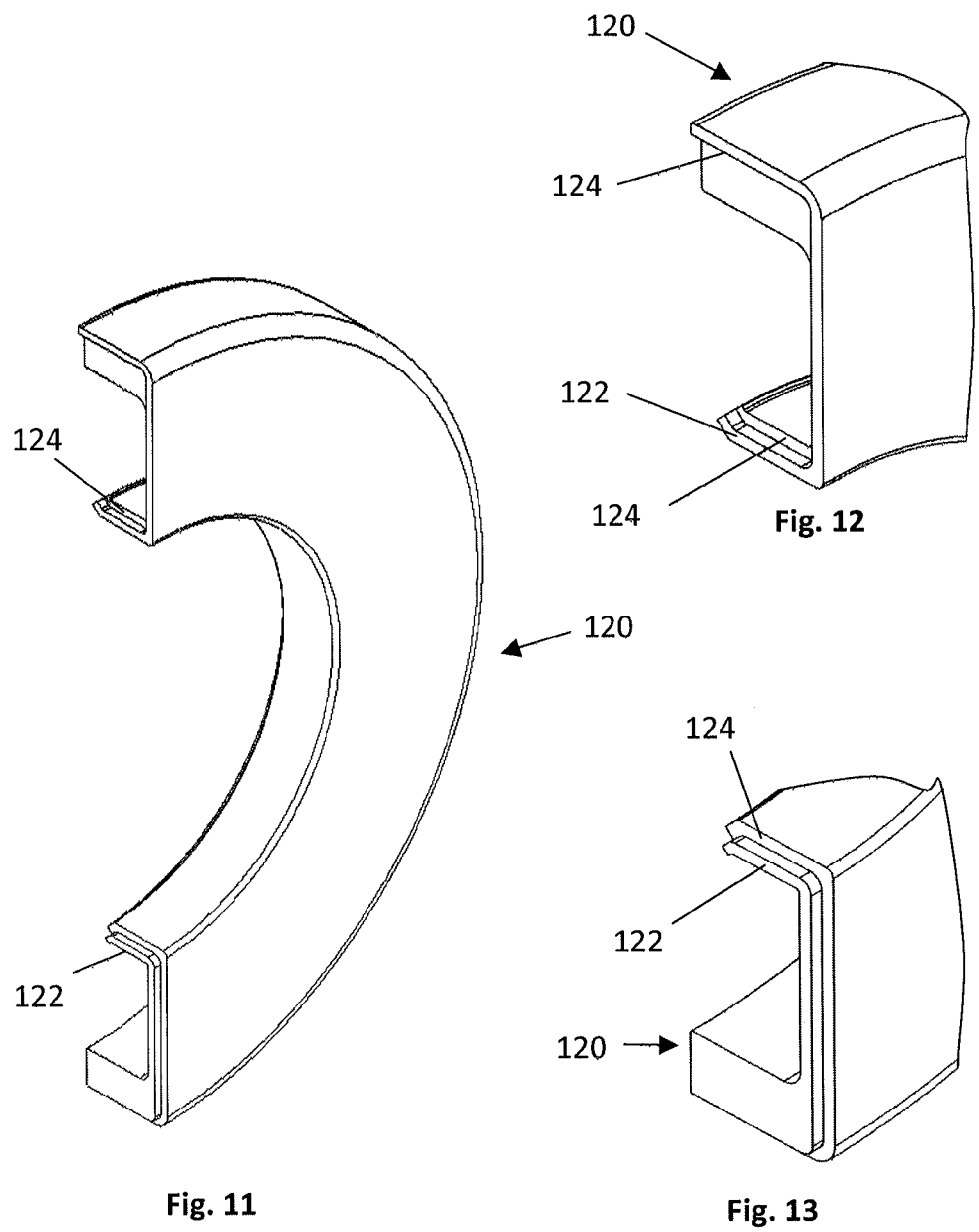
FIG. 11 is a perspective view of another embodiment of the stator ring half having mating projections and recesses at the parting plane.
FIG. 13 is an enlarged fragmentary perspective view of the stator ring half in FIG. 11 at the lower end.

FIGS. 11-13 illustrate one half of another embodiment of the stator ring 120 in which each half includes mating projections 122 and recesses 124 at the parting plane. It will be understood that the projection 122 of the one half of the ring matches and mates with the recess on the other half of the ring. Correspondingly, the recess 124 on the one half of the ring matches and mates with the projection on the other half of the ring. When the recesses and projections of each half are in mating relationship, the mating surfaces provide alignment of the halves of the ring, and with a gasket sealing material aid in sealing the halves together. The mating surfaces may also have a pressfit that dispenses with connecting screws or pins. The mating recesses and projections can have various mating shapes and configurations.

The rotor rings and the retention sleeves can also employ mating projections and recesses at the parting plane in the same manner as described and shown on the stator ring in FIGS. 11-13 for alignment and sealing purposes.

The invention has been described in several embodiments, and still other variations can be made. For example, the individual halves of the rotor rings and stator rings have been described as being joined at their parting planes by means of connecting means in the form of screws. However, other connecting means such as press-fit alignment pins may be employed. The outer seal retention sleeve 16 may provide sufficient pressure to hold the halves of the stator 50 together, or that pressure may be applied by the housing in which the seal and shaft are mounted. The halves of the rotor ring 52 can be engaged with the flanges of the inner seal retention sleeve and rely upon the inner sleeve to hold the halves of the rotor together, or may themselves incorporate features for connecting with the shaft. Accordingly, the split non-contact seal of the present invention has been described by way of illustration rather than limitation.

The invention claimed is:

1. A non-contact seal for rotatable shafts comprising:
   an outer seal retention sleeve split diametrically in two halves, and having connecting means enabling the joining of each half to the other to form a complete outer seal retention sleeve circumscribing a seal axis;

a stator ring split diametrically in two halves, and having connecting means for joining each half to the other in mating relationship to form a complete stator ring circumscribing the seal axis, the complete stator ring defining an annular channel circumscribing the stator ring and facing in the axial direction of the seal, the complete stator ring also fitting within the outer seal retention sleeve with an interference fit;

a rotor ring split diametrically in two halves, and having connecting means for joining each half to the other in mating relationship to form the complete rotor ring of the non-contacting seal, the complete rotor ring defining an annular centrifugal pressurizing chamber circumscribing the rotor ring for pressurizing lubricating or other fluid in the chamber when the rotor ring is rotated about the axis of the seal, the annular centrifugal pressurizing chamber being positioned in the annular channel of the stator ring and having a discharge port at the outer periphery of the chamber for discharging pressurized fluid into the annular channel of the stator ring;

an inner seal retention sleeve split diametrically in two halves, and having connecting means enabling the joining of each half to the other to form a complete inner seal retention sleeve circumscribing the seal axis, the inner seal retention sleeve and the rotor ring having an interference fit; and a plurality of pumping discs positioned in the centrifugal pressurizing chamber to aid the pressurization of the fluid in the chamber, the pumping discs as a group being split diametrically in two halves with one half of the group secured by a locating pin to one half of the rotor ring to position the one half of the group in one half of the centrifugal pressurizing chamber defined by the rotor ring and with the other half of the group secured by another locating pin to the other half of the rotor ring to position the other half of the group in the other half of the centrifugal pressurizing chamber.

2. A non-contact seal as defined in claim 1 wherein the outer seal retention sleeve has inwardly projecting flanges to capture the stator ring within the outer sleeve, and the inner seal retention sleeve has outwardly projecting flanges to capture the rotor ring within the inner sleeve.

3. A non-contact seal as defined in claim 1 further including gasket material interposed between the mating halves of the stator ring, and the mating halves of the rotor ring.

4. A non-contact seal as defined in claim 1 wherein the rotor ring is formed by two annular components press fit to one another to define the annular centrifugal pressurizing chamber, the annular elements press fit together being split diametrically at a parting plane.

5. A non-contact seal as defined in claim 1 wherein the connecting means comprise screws.

6. A non-contact seal as defined in claim 1 wherein the connecting means comprise press-fit alignment pins.

7. A non-contact seal for mounting on a shaft without accessing the end of the shaft comprising:

an inner retention sleeve split diametrically in two halves, each half being mated with the other half to form a complete inner retention sleeve for mounting on a shaft rotatable about a shaft axis;

a rotor ring split diametrically in two halves, each half of the rotor ring being mounted on the inner retention sleeve and mated with the other half to form a complete rotor ring circumscribing the inner retention sleeve, the rotor ring defining an annular centrifugal pressurizing chamber for pressurizing and discharging a fluid when the rotor ring is rotated with the retention sleeve about the shaft axis;

a stator ring split diametrically in two halves, each half of the stator ring being mated with the other half to form a complete stator ring circumscribing the inner retention sleeve and being free to remain stationary while the inner retention sleeve and rotor ring rotate with a shaft; the stator ring defining an annular channel receiving the annular centrifugal pressurizing chamber of the rotor ring and fluid discharged from the chamber;

an outer retention sleeve split diametrically in two halves, each half of the sleeve being mated with the other to form a complete outer retention sleeve circumscribing the stator ring and engaging the stator ring with an interference fit; and a plurality of pumping discs positioned in the centrifugal pressurizing chamber to aid the pressurization of the fluid in the chamber, the pumping discs as a group being split diametrically in two halves with one half of the group secured by a locating pin to one half of the rotor ring to position the one half of the group in one half of the centrifugal pressurizing chamber defined by the rotor ring and with the other half of the group secured by another locating pin to the other half of the rotor ring to position the other half of the group in the other half of the centrifugal pressurizing chamber.

8. A non-contact seal for mounting on a shaft without accessing the end of the shaft as defined in claim 7 further including a gasket material interposed between the mating halves of the rotor ring and a gasket material interposed between the mating halves of the stator ring.

9. A non-contact seal as defined in claim 7 wherein the two halves of the outer retention sleeve have an interference fit with the stator ring.

10. A non-contact seal as defined in claim 7 wherein the two halves of the rotor ring have an interference fit with the inner retention ring.

11. A non-contact seal as defined in claim 7 wherein the each half of the rotor ring is comprised by press-fit components mated with the corresponding components of the other half.

12. A non-contact seal as defined in claim 7 wherein the inner retention sleeve has outwardly projecting flanges capturing the rotor ring between the flanges and connecting means holding the two halves of the inner retention sleeve together.

13. A non-contact seal as defined in claim 7 wherein the outer retention sleeve has inwardly projecting flanges capturing the stator ring between the flanges and connecting means holding the two halves of the outer retention sleeve together.

14. A non-contact seal as defined in claim 7 wherein a pair of the rotor rings and the stator rings, all of which are split diametrically, are captured back-to-back between the inner retention sleeve and the outer retention sleeve, the one rotor ring and stator ring forming a non-contact seal having components arranged for pumping lubricating fluid to a bearing, and the other rotor ring and stator ring forming a non-contact seal having components arranged for excluding contaminants from the bearing.

15. A non-contact seal as defined in claim 7 wherein the inner retention sleeve includes an annular groove extending circumaxially around the sleeve on a radially inner surface, and the outer retention sleeve includes an annular groove extending circumaxially around the sleeve on a radially outer surface, each of the annular grooves being provided to accommodate resilient sealing rings.

16. A non-contact seal for rotatable shafts comprising:
a stator ring split diametrically in two halves, and having connecting means for joining each half to the other at a parting plane in mating and aligned relationship to form a complete stator ring circumscribing the seal axis, the complete stator ring defining an annular channel circumscribing the stator ring and facing in the axial direction of the seal;
a rotor ring split diametrically in two halves, and having connecting means for joining each half to the other at a parting plane in mating and aligned relationship to form the complete rotor ring of the non-contacting seal, the complete rotor ring defining an annular centrifugal pressurizing chamber circumscribing the rotor ring for pressurizing lubricating or other fluid in the chamber when the rotor ring is rotated about the axis of the seal, the annular centrifugal pressurizing chamber being positioned in the annular channel of the stator ring and having a discharge port at the outer periphery of the chamber for discharging pressurized fluid into the annular channel of the stator ring; and
a plurality of pumping discs positioned in the centrifugal pressurizing chamber to aid the pressurization of the fluid in the chamber, the pumping discs as a group being split diametrically in two halves with one half of the group secured by a locating pin to one half of the rotor ring to position the one half of the group in one half of the centrifugal pressurizing chamber defined by the rotor ring and with the other half of the group secured by another locating pin to the other half of the rotor ring to position the other half of the group in the other half of the centrifugal pressurizing chamber.

17. A non-contact seal for rotatable shafts as defined in claim 16 wherein the connecting means for the stator ring includes mating projections and recesses in the each half of the ring at the parting plane.

18. A non-contact seal for rotatable shafts as defined in claim 16 wherein the connecting means for the rotor ring includes mating projections and recesses in each half of the ring at the parting plane.

19. A non-contact seal for rotatable shafts as defined in claim 16 wherein the two halves of the stator ring include mounting features for mounting the seal directly in a housing supporting the non-contact seal and a rotatable shaft.

20. A non-contact seal for rotatable shafts as defined in claim 19 wherein the mounting features on the stator ring are selected from a group of features consisting of flanges, annular sealing grooves, and outer diameters mated to a bearing housing.

21. A non-contact seal for rotatable shafts as defined in claim 16 wherein the two halves of the rotor ring include mounting features for mounting the seal directly on a rotatable shaft.

22. A non-contact seal for rotatable shafts as defined in claim 21 wherein the mounting features on the rotor ring are selected from a group of features consisting of flanges, annular sealing grooves, and inner diameters mated to a rotatable shaft.

* * * * *